US012736655B2

(12) United States Patent
West et al.

(10) Patent No.: US 12,736,655 B2
(45) Date of Patent: Sep. 15, 2026

(54) SENSOR FUSION-BASED GCS FOR AESA RADAR VIA ADAPTIVE PATTERN NULL FORMING

(71) Applicant: Rockwell Collins, Inc., Cedar Rapids, IA (US)

(72) Inventors: James B. West, Cedar Rapids, IA (US); Venkata A. Sishtla, Cedar Rapids, IA (US); Jiwon L Moran, Marion, IA (US); Orion D. Davies, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 166 days.

(21) Appl. No.: 18/239,297

(22) Filed: Aug. 29, 2023

(65) Prior Publication Data

US 2025/0076482 A1 Mar. 6, 2025

(51) Int. Cl.
*G01S 13/52* (2006.01)
*G01S 13/524* (2006.01)
*G01S 13/933* (2020.01)

(52) U.S. Cl.
CPC ........ *G01S 13/5244* (2013.01); *G01S 13/933* (2020.01)

(58) Field of Classification Search
CPC .......................... G01S 13/5244; G01S 13/933
USPC ........................................................ 342/159
See application file for complete search history.

(56) References Cited

U.S. PATENT DOCUMENTS

| | | | | |
|---|---|---|---|---|
| 5,173,706 A * | 12/1992 | Urkowitz | G01S 7/032 | 342/39 |
| 6,633,253 B2 * | 10/2003 | Cataldo | G01S 13/5244 | 342/25 R |
| 8,203,480 B1 * | 6/2012 | Woodell | G01S 7/4026 | 342/26 B |
| 9,019,145 B1 * | 4/2015 | Sishtla | G01S 13/953 | 342/26 B |
| 10,224,979 B1 | 3/2019 | Hunter et al. | | |
| 11,181,634 B1 * | 11/2021 | Lue | G06N 3/045 | |
| 11,506,775 B2 * | 11/2022 | Holt | H01Q 1/525 | |

(Continued)

FOREIGN PATENT DOCUMENTS

| | | |
|---|---|---|
| WO | 2022079189 A3 | 6/2022 |
| WO | 2022139782 A1 | 6/2022 |

OTHER PUBLICATIONS

European Search Report received in EP Application No. 24192330.9, Feb. 3, 2025, 8 pages.

*Primary Examiner* — Resha Desai
*Assistant Examiner* — Samarina Makhdoom
(74) *Attorney, Agent, or Firm* — Suiter Swantz IP

(57) ABSTRACT

An aircraft radar system includes an antenna, a processor, and a data storage element. The data storage element includes geolocation data of ground-based structures that are likely to produce ground clutter. Based on the location and orientation of the aircraft, the processor determines where to produce a null in the antenna beam to exclude the ground clutter. Sensors on the aircraft provide data to geolocate ground clutter inducing targets in real-time. Sensor data is collated, and potentially correlated to stored maps or other databases. A trained machine learning algorithm may receive sensor data and other inputs to identify ground clutter inducing targets, and potentially generate nulls to exclude such targets.

17 Claims, 5 Drawing Sheets

(56) References Cited

U.S. PATENT DOCUMENTS

2021/0132219 A1* 5/2021 Vacanti .................... G01S 7/35
2022/0082687 A1* 3/2022 Sishtla ................. G01S 13/953

* cited by examiner

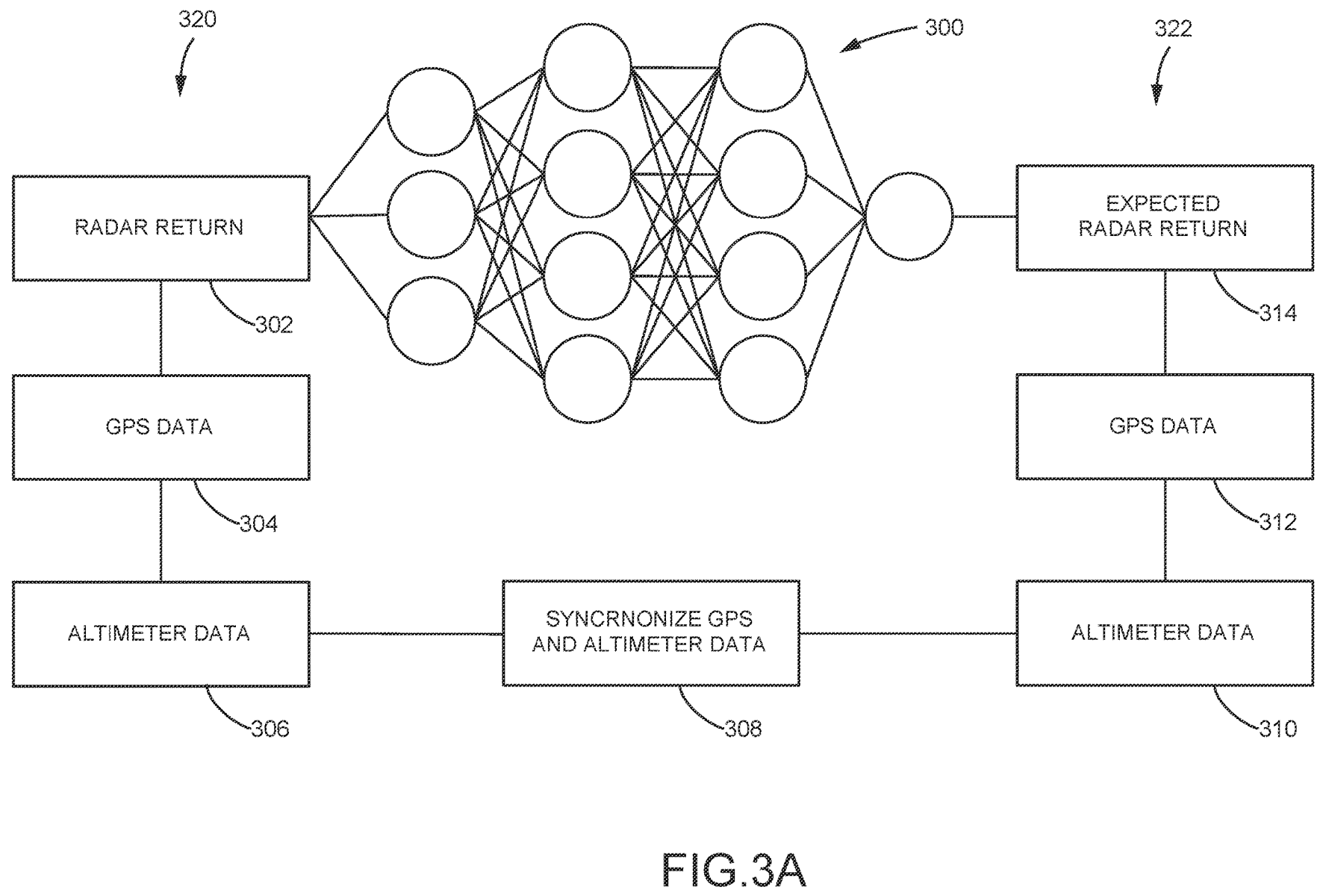

322
EXPECTED RADAR RETURN
314
GPS DATA
312
ALTIMETER DATA
310
300
SYNCRNONIZE GPS AND ALTIMETER DATA
308
320
RADAR RETURN
302
GPS DATA
304
ALTIMETER DATA
306

FIG.3A

SENSOR FUSION-BASED GCS FOR AESA RADAR VIA ADAPTIVE PATTERN NULL FORMING

BACKGROUND

Conventional weather radar systems are designed to detect weather phenomena such as precipitation, clouds, and turbulence. However, the radar signals can also detect non-weather targets such as buildings, trees, mountains, and other ground-based obstacles. These non-weather targets can produce unwanted radar echoes or reflections that clutter the radar display and obscure the detection of weather phenomena.

For an airborne weather radar, detecting microbursts is very challenging due to the presence of strong ground clutter. In civil aviation, numerous airports exhibit strong reflecting objects such as bridges, building infrastructure, runway lights, etc., that create severe challenges for state-of-the-art commercial airborne radar applications. False alerts due to strong clutter targets can result in disruption to the flight. These clutter inducing objects are well documented in terms of longitude, latitude, and altitude, and are stored in various terrain mapping data sets. The scattering objects are essentially geolocation time invariant.

Ground clutter can be reduced by using various signal processing techniques such as filtering, thresholding, and clutter maps. However, these techniques are not always effective, especially in areas with high densities of obstacles or uneven terrain. Therefore, there is a need for a weather radar system that can effectively reduce ground clutter caused by non-weather targets.

SUMMARY

In one aspect, embodiments of the inventive concepts disclosed herein are directed to an aircraft radar system including an antenna, a processor, and a data storage element. The data storage element includes geolocation data of ground-based structures that are likely to produce ground clutter. Based on the location and orientation of the aircraft, the processor determines where to produce a null or adjust a taper in the antenna radiation pattern to exclude the ground clutter.

In a further aspect, sensors on the aircraft provide data to geolocate ground clutter inducing targets in real-time. Sensor data is collated, and potentially correlated to stored maps or other databases.

In a further aspect, a trained machine learning algorithm may receive sensor data and other inputs to identify ground clutter inducing targets, and potentially generate nulls or adjust tapers to exclude such targets. Machine learning algorithms may enable multiple sensors to add multiple. different sensor data sets to aid with clutter verification; rapid data analytics and adaptation of live data on an air platform; and active nulling which enables adaptive changes in null location and null shapes to efficiently block clutter.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which:

FIG. 3A shows a block diagram of a method for training a neural network according an exemplary embodiment;

DETAILED DESCRIPTION

Figure 1:
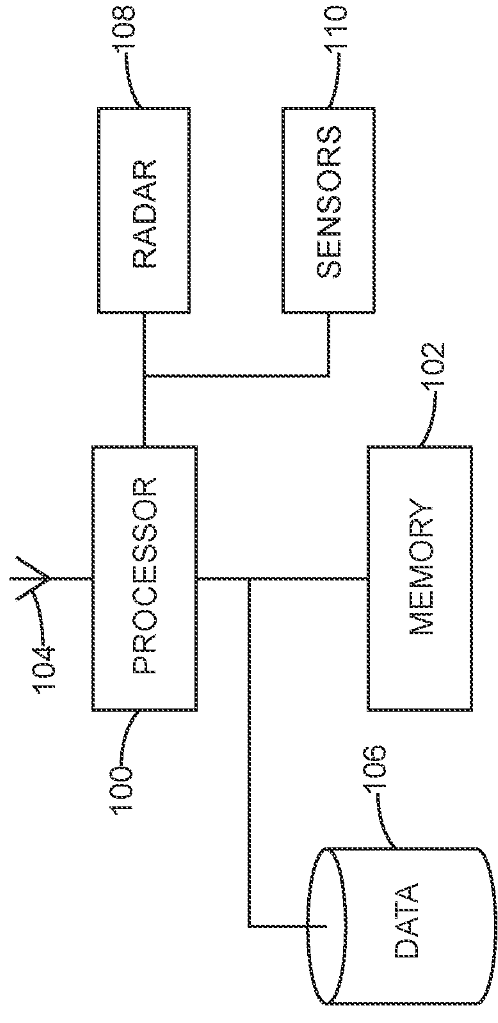
FIG. 1 shows a block diagram of a system suitable for implementing exemplary embodiments.

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of a feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to an aircraft radar system including an antenna, a processor, and a data storage element. The data storage element includes geolocation data of ground-based structures that are likely to produce ground clutter. Based on the location and orientation of the aircraft, the processor determines where to produce a null or adjust a taper in the antenna beam to exclude the ground clutter. Sensors on the aircraft provide data to geolocate ground clutter inducing targets in real-time. Sensor data is collated, and potentially correlated to stored maps or other databases. A trained machine learning algorithm may receive sensor data and other inputs to identify ground clutter inducing targets, and potentially generate nulls or adjust tapers to exclude such targets. Machine learning algorithms may enable multiple sensors to add multiple data sets to aid with clutter verification; rapid data analytics and adaptation of live data on an air platform; and active nulling which enables adaptive changes in null location and null shapes to efficiently block clutter.

Referring to FIG. 1, a block diagram of a radar system suitable for implementing exemplary embodiments is shown. It is difficult to detect targets that may have ground contamination. Some ground contamination may represent very bright targets (that saturate sensitive radar receive circuitry), even coming through side lobes. Such ground contamination cannot be differentiated from other threats. For low-cost ESAs, the amount of side lobes that we can suppress is smaller than for contemporary, mechanically steered slotted waveguide flat-plate arrays. Current flat-plate arrays may have 2-way side lobes of about 60 dB from the main lobe. ESAs may have 2-way side lobes of 40 dB to 50 dB from the main lobe. Suppressing side lobes is paramount, especially to reduce undesired clutter signals embedded within the side lobes that would prevent low level windshear signals from being detected within the main beam. However, when suppressing bright ground clutter, real targets may also be suppressed.

In at least one embodiment, the radar system includes at least one processor 100, memory 102 connected to the processor 100 for embodying non-transitory processor executable code, and an ESA antenna 104. The processor 100 is configured to retrieve data from a data storage element 106; the data corresponding to known locations of stationary ground clutter/ground obstacles. The processor 100 determines a relative location of the ground clutter with respect to the aircraft based on the known location of the aircraft and the known locations of the ground clutter.

The processor 100 determines an electronic configuration for the ESA 104 to produce a null toward the determined relative location. Such null excludes the ground clutter and allows the ESA 104 to receive return signals from targets that may otherwise by obfuscated by return signals from the ground clutter. The nulls are created by adjusting the phase and amplitude of the ESA's aperture excitation using an adaptive nulling algorithm. It may be appreciated that while specific embodiments described herein are directed to null placement, the methodologies are also applicable to modify sidelobes by adjusting amplitude taper of the signal.

In at least one embodiment, as the as the aircraft moves through space and as the ESA 104 is steered across the horizon/azimuth, the processor 100 recomputes electronic configurations for the ESA 104 to maintain the null in direction of the determined location for each subsequent pulse. In at least one embodiment, the processor 100 may use a priori information from the data storage element 106 to apply an adaptive taper.

A priori information from the data storage element 106 may comprise sets of coordinates and altitudes of known structures. The processor may then receive the location of the aircraft and determine the distance of the aircraft from the coordinates. Alternatively, the a priori information may comprise precomputed nulls to apply at various locations along a flight path.

In at least one embodiment, some or all of the data in the data storage element 106 may be derived via one or more sensors 110, including one or more radars 108 and vision sensors, in data communication with the processor 100. Such sensors 108, 110 may include, but are not limited to, temperature sensors, GPS/GNSS, Precision Navigation Timing (PNT), weather radar relative navigation, radar landing altimeter, Electro-optic runway landing imagers, TACAN, LORAN and glide slope/localizer landing systems, FAA mandated Communications, Navigation and Surveillance (CNS) system, or the like. Data from such sensors 108, 110 may be geolocated and collated with other data in the data storage element 106 such as maps, data recorded over multiple flights, or other data sets to produce a more complete picture of the surrounding area to determine where nulls are desirable to exclude large, stationary targets. Furthermore, any such data may be received via a datalink connection from external sources. The processor 100 may embody a multi frequency feedback system whereby radar returns and sensor inputs drive beam shaping via sensor fusion.

In at least one embodiment, the processor 100 may embody a trained AI configured to receive sensor data including data stream from the sensors 108, 110 in real-time to identify ground clutter. For example, image streams from one or more radars 108 may be used in conjunction with an object recognition algorithm to locate ground clutter determine a geolocation based on other inputs. The processor 100 may then produce and steer a corresponding null. It may be appreciated that the processor 100 may include a general-purpose processor for sensor 108, 110 analysis and/or a field programmable gate array to electronically configure the ESA 104.

In one exemplary embodiment, data from a radio altimeter may be combined with an air data system for heading information and GPS for latitude and longitude to steer a null automatically. Where a stationary, ground clutter (e.g., a bridge) is within radar range, the processor 100 may place and steer a null in the direction of the ground clutter while the radar is looking further down a runway for windshear, for example. Likewise, during takeoff, that null position may change because the position of the ground clutter with respect to the angle of the radar is changing as the aircraft gets closer to the ground clutter.

While specific descriptions have been directed toward "ground clutter", it may be appreciated that the principles may be applied to any stationary target, whether or not it may be classified as ground clutter, that should be rejected in favor of other targets that might be obscured otherwise.

In at least one embodiment, the system may embody a multi-mode radar (weather, windshear, detect and avoid, runway imaging, or the like). In such cases, clutter may not necessarily be stationary. For example, it may be desirable to exclude airplanes within view of the radar that may cause some ground clutter or false alerts. The inventive principles described herein are applicable to any application where it would be desirable to exclude targets with a known and predictable relative position with respect to the ESA 104.

Figure 2:
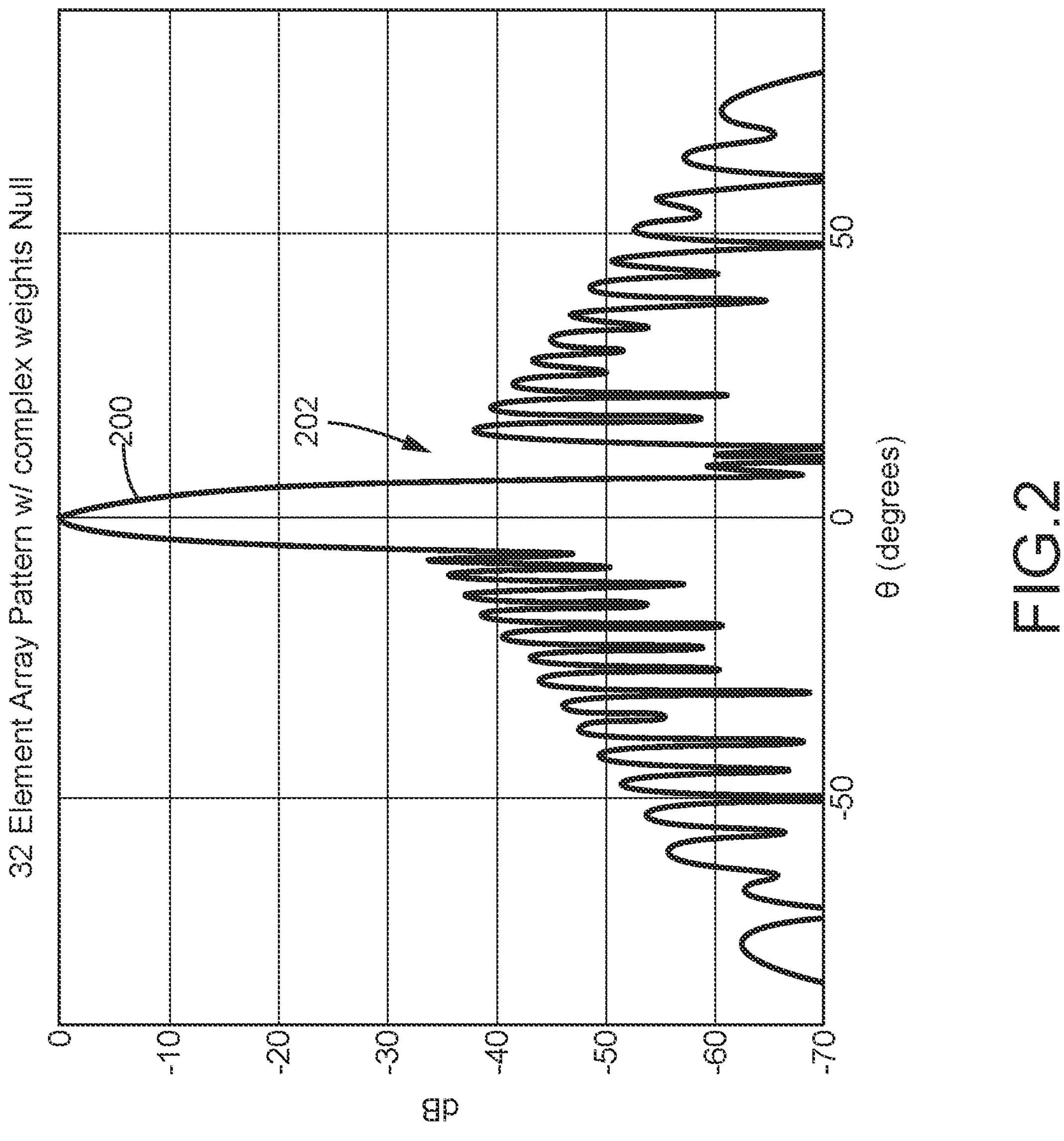
FIG. 2 shows a radiation pattern according to an exemplary embodiment.

Referring to FIG. 2, a 1-way radiation pattern according to an exemplary embodiment is shown. The antenna pattern includes a main lobe 200 and corresponding side lobes. Where ground clutter is within the view or return of the side lobes, such return signals may obscure desirable targets. A null 202 (or taper adjustment) is created and steered using complex weights of the AESA. The 2-way side lobes in the area of interest (around 10 degrees) may be at least 70 dB below the main lobe 200. This will essentially eliminate the return power from any undesired clutter targets.

Figure 3B:
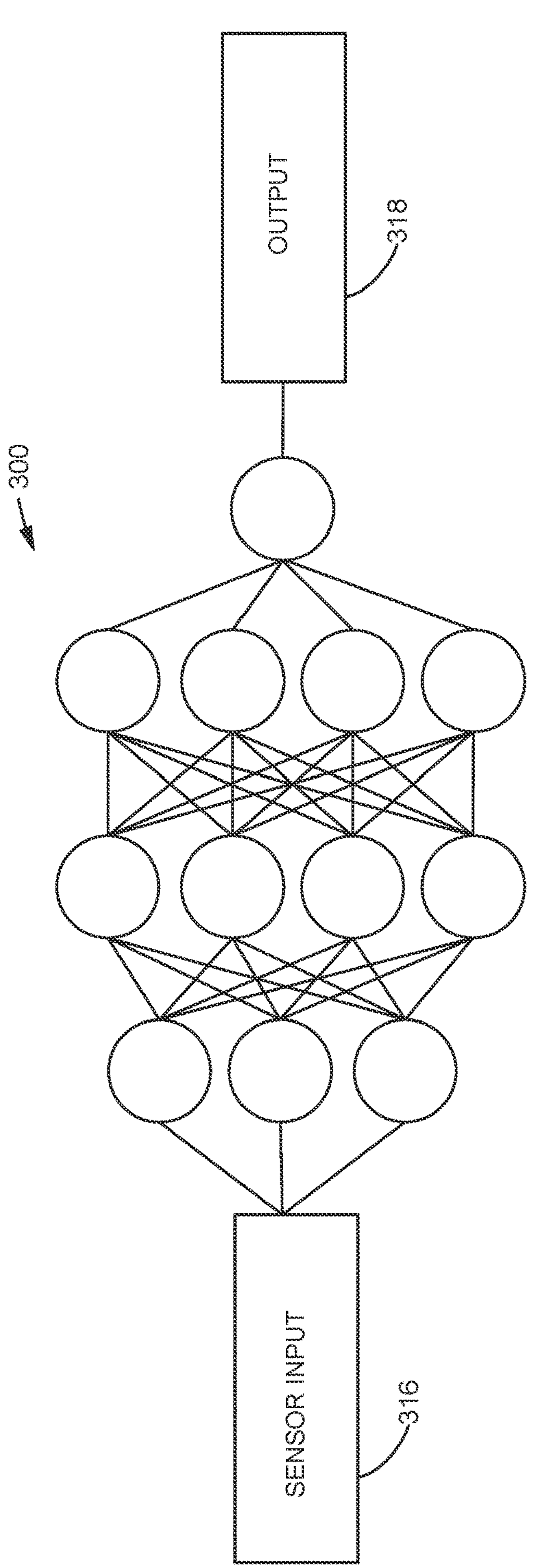
FIG. 3B shows a block diagram of a method for utilizing a neural network according to an exemplary embodiment.

Referring to FIGS. 3A-3B, block diagrams of a neural network 300 according an exemplary embodiment of the inventive concepts disclosed herein is shown. The neural network 300 comprises an input layer, and output layer, and a plurality of internal layers. Each layer comprises a plurality of neurons or nodes. The neural network 300 receives signals and identifies the locations of non-weather targets such as buildings, trees, mountains, and other ground-based obstacles (or the known locations of mobile obstacles); furthermore, the neural network 300 may be trained to identify patterns of ground clutter. The neural network 300 may then output nulls at these locations, or adjustments to a taper, to effectively suppress radar echoes from the non-weather targets and reduce ground clutter.

During a training phase, as shown in FIG. 3A, the neural network 300 receives training data 320 including radar return data 302 tagged with sensor data such as GPS data 304 and altimeter data 306. The radar return data 302 may comprise raw data acquisition of the time domain I/Q signal. Such raw data may be represented as a 2-dimensional tensor for a fixed sample time (represented as an image). The training data 320 is associated with an output 322 including a radar return signal 314 without clutter.

To train the neural network 300, training data 320 must include radar return signals 302 with and without clutter and labeled ground truth radar return signal 314. The output data 322 may also include GPS data 312 and altimeter data 310. During training, the GPS data 304, 312 and altimeter data 306, 310 are synchronized 308. The GPS data 304, 312 and altimeter data 306, 310 represent boundary conditions.

The boundary conditions indicate that the system knows what a radar return signal should be at a specific geolocation, as defined by GPS and an altimeter (such as a radio altimeter). Synchronization 308 ensures that the radar return data 302 at that known GPS location and that known radio altimeter reading is logically constrained to the data labels. For training purposes, it may be insufficient to provide a radar return signal 302 and a radar return signal 314 without clutter for training. Boundary conditions provide additional context to logically constraint the process from providing a false decluttered image.

In at least one embodiment, radar return signal 302 may be tagged with an I value and a Q value in the time domain, and the corresponding time of the sample. The training data 320 comprises samples for fixed time intervals. The neural network 300 may be trained to adjust the I/Q values to match expected return value as if the clutter was not present.

During an execution phase, as shown in FIG. 3B, input 316 to the neural network 300, including radar return signals, GPS data, and altimeter data, may produce radar return signal outputs with adjustments to the time domain I/Q signal such that the output 318 of the neural network is the time domain I/Q with clutter removed, if it's present, for a given GPS geolocation and a given altitude based on the radio altimeter.

While the description herein is directed to a specific implementation of a neural network, it may be appreciated that other machine learning techniques and algorithms are envisioned. For example, a convolution neural network may be trained for image/feature extraction.

It may be appreciated that while a single neural network 300 is illustrated, embodiments of the present disclosure may utilize multiple, independent neural networks.

Figure 4:
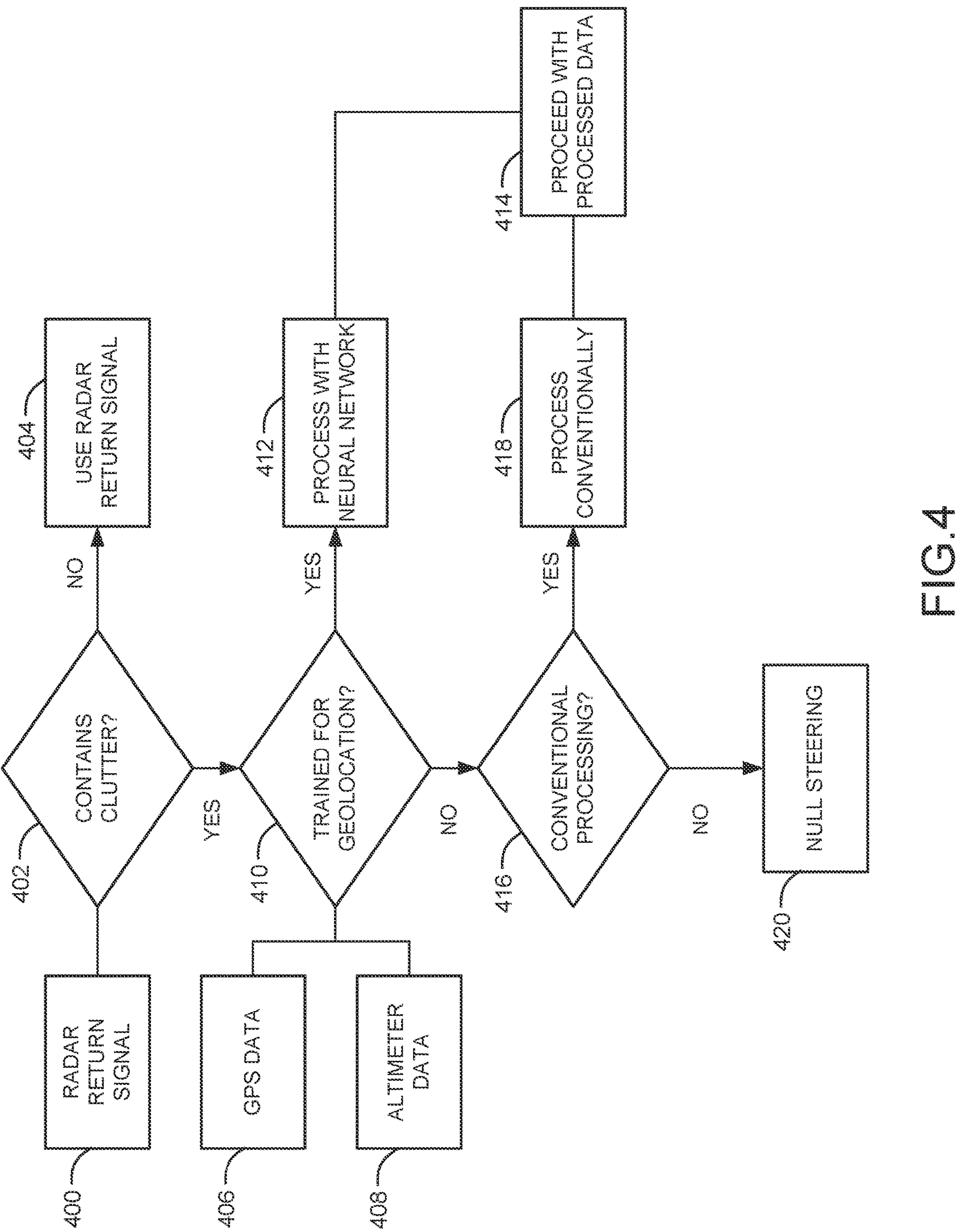
FIG. 4 shows a flowchart of a method for determining a processing architecture to de-clutter a return signal.

Referring to FIG. 4, a flowchart of a method for determining a processing architecture to de-clutter a return signal is shown. The system making the determination may receive a radar return signal 400. The radar return signal 400 may comprise a time domain I/Q signal. The system determines 402 is if the radar return signal 400 contains clutter; this determination 402 may be algorithmic, selected by a crewmember, or some default setting. If no clutter is present, a system may use 404 the radar return signal 400 without modification.

If the system determines 402 that cutter is (or may be) present, the system may receive GPS data 406 and altimeter data 408. Where the system includes a trained neural network, the system may determine 410 if the neural network is trained on data including the boundary constraint of the current geolocation and altitude (e.g., if there is a file in memory corresponding to those boundary constraints). If so, the system may process the radar return signal 400 via the neural network (including GPS data 406 and altitude data 408) as described herein. The system then proceeds 414 with the processed radar return signal.

If the system determines 410 that the neural network is not trained on data including the boundary constrain of the current geolocation and altitude, or if no trained neural network is present, the system may determine 416 if convention algorithmic processing is desirable. If so (e.g., no a priori data exists for null steering), then the radar return signal 400 is processed 418 conventionally, and the system proceeds 414 to utilize the processed radar return signal.

If the system determines 416 that conventional processing is not desirable, the system may utilize null steering 420 to point nulls or adjust tapers at the clutter source in order to minimize the amount of reflected energy from that cluttering objects. Alternatively, or in addition, the system may skew the main beam toward the sky and use a side lobe to pick up the radar return signal and minimize the intensity coming from the clutter source.

Accurately detecting threats is key to developing an ESA radar for autonomous operation. Mitigating false windshear alerts due to ground clutter is essential for achieving full MOPS compliance. Adaptively adjusting the taper on receive will provide a path towards full MOPS compliance by minimizing side lobe clutter while preserving SNR. Our competitors are also currently pursuing an ESA solution.

Embodiments of the present disclosure enable an enhanced weather radar system for applications such as aviation, meteorology, and military surveillance. They provide an efficient and effective solution for reducing ground clutter and improving the detection of weather phenomena. In addition to weather detection, dynamic antenna pattern nulling can also be used for "down-looking" where the radar is tasked with searching and tracking several airborne targets within a high ground clutter environment. In a complex search and track environment, embodiments can steer a null in the direction of clutter (ground or weather) while preserving the integrity of the target detection, as reference against absolute "earth" coordinates.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. A computer apparatus comprising:

an electronically scanned array (ESA) antenna;

a data storage element; and at least one processor in data communication with the ESA antenna, the data storage element, and a memory storing processor executable code for configuring the at least one processor to:

retrieve geolocation coordinate data associated with a ground clutter source from the data storage element;

determine a relative location of the ground clutter source with respect to the ESA antenna based at least in part on the geolocation coordinate data and aircraft state data from one or more sensors;

receive a plurality of sensor streams from a plurality of sensors;

collate the sensor streams based on time stamps and an aircraft location and altitude;

identify one or more ground clutter sources based on the sensor streams;

determine an electronic configuration to produce a null in a radiation pattern of the ESA corresponding to the relative location of the ground clutter source by applying complex weights to an aperture of the ESA including at least one of an amplitude taper and a non-uniform phase distribution; and continuously recalculate the relative location and continuously recalculate and apply the amplitude taper or the non-uniform phase distribution while the relative location of the ground clutter source changes, to maintain side lobe levels toward the ground clutter source.

2. The computer apparatus of claim 1, wherein the at least one processor is configured to retrieve a predetermined geolocation of the ground clutter source from the data storage element.

3. The computer apparatus of claim 1, wherein:

the at least one processor is configured as a trained neural network; and the trained neural network is configured to:

receive at least the sensor streams;

determine a current geolocation and altitude;

determine that the neural network is trained for the current geolocation and altitude; and determine an I/Q adjustment to a radar return signal.

4. The computer apparatus of claim 1, wherein the plurality of sensors includes one or more of GPS/GNSS receivers, Precision Navigation Timing (PNT), weather radar relative navigation, radar landing altimeter, Electro-optic runway landing imagers, TACAN, LORAN and glide slope/localizer landing systems.

5. The computer apparatus of claim 1, wherein the null is at least 70 dB below a main lobe in the radiation pattern.

6. The computer apparatus of claim 1, wherein the at least one processor comprises a processor configured to determine the relative location and a field programmable gate array configured to produce the electronic configuration.

7. A method comprising:

retrieving geolocation coordinate data associated with a ground clutter source;

determining a relative location of the ground clutter source with respect to an electronically scanned array (ESA) antenna based at least in part on the geolocation coordinate data and aircraft state data from one or more sensors;

receiving a plurality of sensor streams from a plurality of sensors;

collating the sensor streams based on time stamps and an aircraft location and altitude;

identifying one or more ground clutter sources based on the sensor streams;

determining an electronic configuration to adjust an amplitude taper or non-uniform phase distribution along an aperture of the ESA antenna to create a radiation pattern of the ESA to manipulate side lobe levels at a location corresponding to the relative location of the ground clutter source; and continuously recalculating the relative location and continuously adjusting the amplitude taper and non-uniform phase distribution as a relative location of the ground clutter source changes to maintain the manipulated side lobe levels toward the ground clutter source.

8. The method of claim 7, further comprising retrieving a predetermined geolocation of the ground clutter source from a data storage element.

9. The method of claim 7, wherein:

a trained neural network is configured to:

receive at least the sensor streams;

determine a current geolocation and altitude;

determine that the neural network is trained for the current geolocation and altitude; and determine an I/Q adjustment to a radar return signal.

10. The method of claim 7, wherein the plurality of sensors includes one or more of GPS/GNSS receivers, Precision Navigation Timing (PNT), weather radar relative navigation, radar landing altimeter, Electro-optic runway landing imagers, TACAN, LORAN and glide slope/localizer landing systems.

11. The method of claim 7, wherein the side lobe level is at least 70 dB below a main lobe in the radiation pattern at the location corresponding to the relative location of the ground clutter source.

12. A multi-mode radar system comprising:

an electronically scanned array (ESA) antenna;

a data storage element; and at least one processor in data communication with the ESA antenna, the data storage element, and a memory storing processor executable code for configuring the at least one processor to:

retrieve geolocation coordinate data associated with a ground clutter source from the data storage element;

determine a relative location of the ground clutter source with respect to the ESA antenna based at least in part on the geolocation coordinate data and aircraft state data from one or more sensors;

receive a plurality of sensor streams from a plurality of sensors;

collate the sensor streams based on time stamps and an aircraft location and altitude;

identify one or more ground clutter sources based on the sensor streams;

determine an electronic configuration to produce a null in a radiation pattern of the ESA corresponding to the relative location of the ground clutter source; and continuously recalculate the relative location and continuously recalculate and apply the amplitude taper or the non-uniform phase distribution while the relative location of the ground clutter source changes, to maintain side lobe levels toward the ground clutter source.

13. The multi-mode radar system of claim 12, wherein the at least one processor is configured to retrieve a predetermined geolocation of the ground clutter source from the data storage element.

14. The multi-mode radar system of claim 12, wherein:

the at least one processor is configured as a trained neural network; and the trained neural network is configured to:

receive at least the sensor streams;

determine a current geolocation and altitude;

determine that the neural network is trained for the current geolocation and altitude; and determine an I/Q adjustment to a radar return signal.

15. The multi-mode radar system of claim 12, wherein the plurality of sensors includes one or more of GPS/GNSS receivers, Precision Navigation Timing (PNT), multi-mode radar relative navigation, radar landing altimeter, Electro-optic runway landing imagers, TACAN, LORAN and glide slope/localizer landing systems.

16. The multi-mode radar system of claim 12, wherein the null is at least 70 dB below a main lobe in the radiation pattern.

17. The multi-mode radar system of claim 12, wherein the at least one processor comprises a processor configured to determine the relative location and a field programmable gate array configured to produce the electronic configuration.

* * * * *